US010191269B2

(12) United States Patent
Lundin

(10) Patent No.: US 10,191,269 B2
(45) Date of Patent: Jan. 29, 2019

(54) SLIDE HOLDER FOR AN OPTICAL MICROSCOPE

(71) Applicant: Johan Lundin, Helsinki (FI)

(72) Inventor: Johan Lundin, Helsinki (FI)

(*) Notice: Subject to any disclaimer, the term of this patent is extended or adjusted under 35 U.S.C. 154(b) by 0 days.

(21) Appl. No.: 15/316,519

(22) PCT Filed: Jun. 8, 2015

(86) PCT No.: PCT/FI2015/050398
§ 371 (c)(1),
(2) Date: Dec. 6, 2016

(87) PCT Pub. No.: WO2015/185805
PCT Pub. Date: Dec. 10, 2015

(65) Prior Publication Data
US 2017/0146783 A1 May 25, 2017

(30) Foreign Application Priority Data
Jun. 6, 2014 (FI) ..................................... 20145521

(51) Int. Cl.
*G02B 21/26* (2006.01)
*G02B 21/32* (2006.01)
(Continued)

(52) U.S. Cl.
CPC ......... *G02B 21/26* (2013.01); *G02B 21/0036* (2013.01); *G02B 21/086* (2013.01);
(Continued)

(58) Field of Classification Search
CPC .. G02B 21/00; G02B 21/002; G02B 21/0036; G02B 21/06; G02B 21/24; G02B 21/241;
(Continued)

(56) References Cited

U.S. PATENT DOCUMENTS

| 4,836,667 A * | 6/1989 | Ozeki | ..................... G02B 21/24 |
| | | | 359/389 |
| 5,233,197 A | 8/1993 | Bowman et al. | |

(Continued)

FOREIGN PATENT DOCUMENTS

| WO | WO2005101088 A2 | 10/2005 |
| WO | WO2011138603 A1 | 11/2011 |
| WO | WO2013138911 A1 | 11/2011 |

*Primary Examiner* — Thong Nguyen
(74) *Attorney, Agent, or Firm* — Seppo Laine Oy

(57) ABSTRACT

The invention relates to a microscope slide holder for an optical microscope. The slide holder comprises a base portion, a slide holder portion arranged on the base portion and having a mounting zone capable of receiving microscope slides of one or more slide types, the slide holder portion being movably arranged on the base portion, and a manipulator for moving the slide holder portion with respect to the base portion in three orthogonal dimensions. According to the invention, the base portion is dimensioned to fit into a mounting zone designed for at least one of the one or more microscope slide types. The invention allows for convenient sample movement in microscopes whose sample stage is not inherently designed for scanning microscopy.

16 Claims, 5 Drawing Sheets

(51) Int. Cl.
  *G02B 21/00* (2006.01)
  *G02B 21/34* (2006.01)
  *G02B 21/08* (2006.01)
  *G02B 21/24* (2006.01)
  *G02B 21/36* (2006.01)

(52) U.S. Cl.
  CPC ........... *G02B 21/241* (2013.01); *G02B 21/32* (2013.01); *G02B 21/34* (2013.01); *G02B 21/367* (2013.01)

(58) Field of Classification Search
  CPC ...... G02B 21/242; G02B 21/26; G02B 21/32; G02B 21/34
  See application file for complete search history.

(56) References Cited

U.S. PATENT DOCUMENTS

| | | | | |
|---|---|---|---|---|
| 5,260,562 A | * | 11/1993 | Bearden | G02B 21/002 250/216 |
| 5,376,790 A | * | 12/1994 | Linker | G01Q 10/04 250/307 |
| 5,654,546 A | * | 8/1997 | Lindsay | B82Y 35/00 250/441.11 |
| 5,684,627 A | | 11/1997 | Ganser et al. | |
| 6,359,370 B1 | * | 3/2002 | Chang | H01L 41/0986 310/328 |
| 7,180,662 B2 | * | 2/2007 | Rondeau | G02B 21/26 359/392 |
| 8,063,383 B2 | * | 11/2011 | Pryadkin | G01B 11/03 250/440.11 |
| 2002/0101654 A1 | | 8/2002 | Pfeifer | |
| 2005/0225852 A1 | | 10/2005 | Rondeau et al. | |
| 2008/0266440 A1 | | 10/2008 | Yazdanfar et al. | |
| 2010/0073672 A1 | | 3/2010 | McMurtry et al. | |
| 2011/0089771 A1 | | 4/2011 | Brooker et al. | |
| 2012/0147461 A1 | | 6/2012 | Seifert et al. | |
| 2015/0054921 A1 | * | 2/2015 | Dixon | G02B 21/26 348/46 |

* cited by examiner

SLIDE HOLDER FOR AN OPTICAL MICROSCOPE

FIELD OF THE INVENTION

The invention relates to optical microscopy and in particular holding of samples in a microscope. More specifically, the invention relates to a microscope slide holder and an optical microscope comprising such slide holder.

BACKGROUND ART

Conventional optical microscopes are equipped with viewing optics arranged on an arm and a sample stage positioned below the sample stage within a focal range of the optics. A sample substrate, i.e. a microscope slide containing the sample to be imaged, is positioned on the sample stage at the optical axis of the viewing optics.

Scanning optical microscopes are used e.g. in microscopy of biological samples and material diagnostics. They typically comprise a specially designed sample stage with integral members for holding a slide and moving the slide perpendicular to the optical axis of the viewing optics (say in X and Y dimensions) so that different parts of the sample can easily be viewed. There may be also an electrical drive for actuation of the movement in an automated fashion.

There are also sample stage assemblies for converting conventional sample stages into X-Y-movable stages. For example WO 2005/101088 discloses a stage assembly mountable on an optical microscope for orienting a sample into a desired focal position includes an X-axis plate operable for rectilinear shifting in the X-axis direction and a Y-axis plate mounted on the X-axis plate operable for rectilinear translation in the Y-axis direction. A Z-axis plate is mounted on the XY plate assembly for carrying a sample to be investigated and a piezoelectric actuator mechanism is interposed between the XY plate assembly and the Z-axis plate operable for rectilinear translation of the Z-axis plate.

In the patent literature, further art is represented by WO 2011/138603, WO 2013/138911, US 2010/0073672, US 2008/0266440, US 2011/0089771, US 2012/0147461 and US 2002/0101654.

In addition, there are separate devices that can be placed on sample stages, such as PInano® "XY(Z) Piezo System P-545.xR7"-series nanopositioning device, designed for superresolution microscopy. The device comprises a shallow but large body with a slide-receiving aperture in the middle and is capable of moving the slide at maximum 0.2 mm in each dimension. Due to its design, the device requires, however a huge amount of flat space on a sample stage compared with the area of the slide, and is therefore not suited for the majority of existing microscopes.

In summary, the existing solutions for automatically moving samples to be imaged require special microscopes with custom sample stages, extensive modifications to ordinary stages or at least large flat sample stages for being able to accommodate the slide moving device.

Thus, there exists a need for improved solutions allowing moving of samples in microscopes with laterally stationary sample stages.

SUMMARY OF THE INVENTION

It is an aim of the invention to solve at least some of the abovementioned problems and to provide an improved solution for implementing scanning optical microscopy.

A particular aim is to provide a novel scanning microscopy-compatible microscope slide holder, which minimizes the need of modifying existing microscope structures. In particular, it would be beneficial to achieve a solution suitable for ordinary microscopes capable of imaging samples on common microscope slides without necessitating extensive permanent modification of the sample stage.

According to an aspect there is provided a microscope slide holder for an optical microscope comprising a base portion, a slide holder portion arranged on the base portion and having a mounting zone capable of receiving microscope slides of one or more slide types, the slide holder portion being movably arranged on the base portion, a manipulator for moving the slide holder portion with respect to the base portion in at least two orthogonal directions, wherein the base portion is dimensioned to fit onto a mounting zone designed for at least one of said one or more microscope slide types.

DESCRIPTION OF EMBODIMENTS

Figure 1:
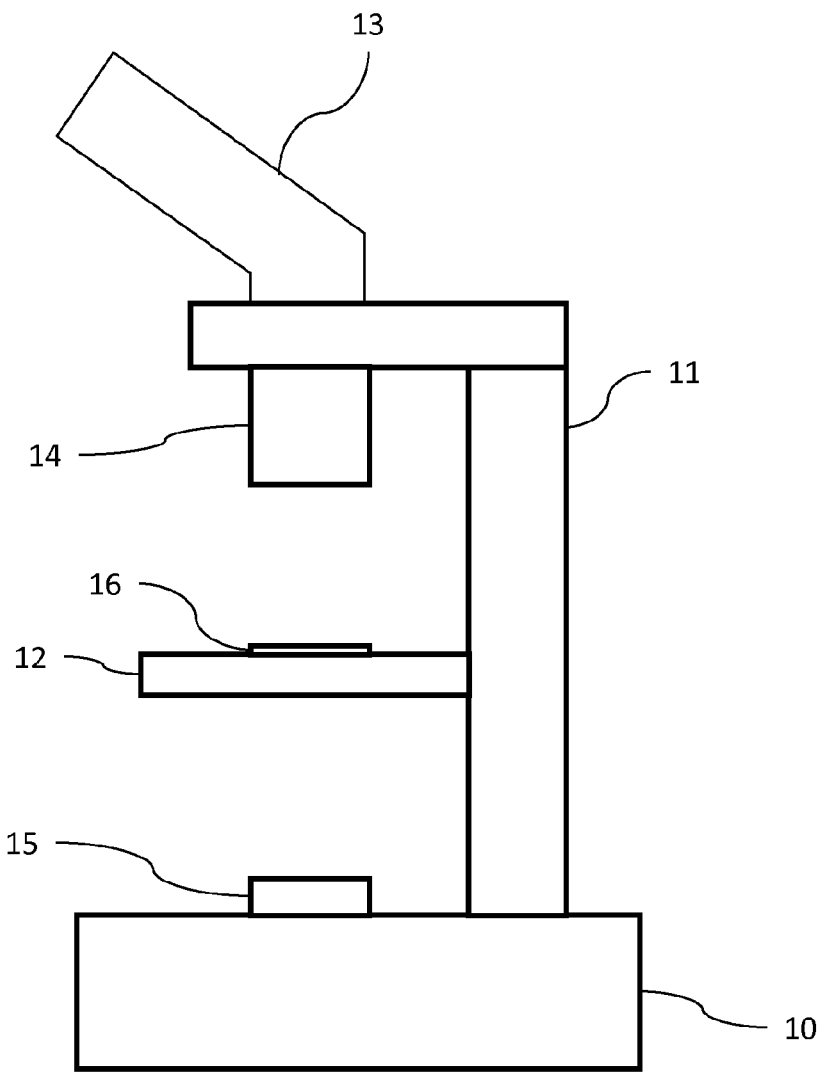
FIG. 1 shows a schematic side view of a microscope provided with a conventional slide.

Generally, the present technology provides for a microscope slide holder for an optical microscope. The holder comprises a base portion, a slide holder portion arranged on the base portion and a manipulator for moving the slide holder portion with respect to the base portion. The base portion is dimensioned to fit onto a mounting zone designed for at least one of the one or more microscope slide types.

"Mounting zone" herein means any zone on a sample stage of a microscope or slide holder portion of the slide holder device that is designed for and capable of receiving a microscope slide for microscopic imaging purposes. Preferably, the mounting zone is designed for and capable of through-illumination of the slide, i.e, is capable of passing light from a light source to imaging optics on different sides of the mounting zone.

"Base portion" refers to a lower portion of the slide holder intended to come against a stationary sample stage of a microscope.

"Slide holder portion" is a portion of the slide holder movably arranged with respect to the base portion.

A "manipulator" means any means capable of providing controlled movement between the portions in at least two lateral dimensions, preferably three dimensions. The manipulator is preferably electrically driven, preferably using piezoelectric elements.

According to one embodiment, the base portion is dimensioned to fit into a mounting zone designed for rectangular 50-100 mm by 20-60 mm slides, in particular 76 mm by N×26 mm (+/−1 mm), where N is an integer greater or equal to 1, in particular equal to 1 or 2. Thus, the holder is mountable on a sample stage of an optical microscope designed to receive for example a standard (ISO 8037 in its current and potentially upcoming versions) microscope slide. The thickness of slides is typically 0.5-2.5 mm, typically about 1 mm±0.2 mm, which is taken into account at least of the mounting zone provides holding members, such as slide holder clips, that are at least partially placed on top of the slide on typically two opposite lateral sides thereof. Therefore, according to one embodiment, the base portion of the slide holder has a thickness of less than 5 mm, in particular the mentioned 0.5-2.5 mm, on at least two opposite lateral sides thereof so that it can fit into a mounting zone designed to grab on edges of the slide using clips, for example.

According to one embodiment, there are provided means on the slide holder portion for immobilizing a slide thereon. Such means may comprise springs, suspended clips, elastic members or mounting screws, to mention some examples. In the aspect of the invention directed to a whole microscope, such means may be provided on the sample stage thereof for immobilizing the slide holder with respect to the stage.

According to one embodiment, there is provided a slide holder comprising a base portion the lateral dimensions is 76 mm by 52 mm or 76 mm by 26 mm or smaller, therefore corresponding with a commonly available slide format. The slide holder portion is arranged on the base portion and has a mounting zone capable of receiving a microscope slide of the ISO 8037 standard 76 mm by 25 mm format, the slide holder portion being movably arranged on the base portion. The slide holder portion can itself be 76 mm by 26 mm or 76 mm by 52 mm or larger, so that it is capable of safely holding a 76 mm by 26 mm/76 mm by 52 mm slide.

According to a first embodiment, the manipulator comprises one or more piezoactive elements capable of moving the slide holder portion in three orthogonal dimensions upon electric excitation. Piezoactive elements are capable of deforming upon application of electric voltage over them. The elements are suitably arranged between the base portion and the slide holder portion such that relative movement between the portions is possible due to this deformation. There are also an electric connector and conductors arranged in the holder such that the excitation voltage can be led to the piezoactive elements. The elements can be stacked side-by-side and/or on top of each other. There may also provided guiding rails or other supporting members functionally connected to the piezoelectric elements to facilitate orthogonal movements.

It is possible to employ also other elements for moving the slide holder portion in three orthogonal dimensions. Thus, according to a second embodiment an actuator is provided by a servo motor, for example a direct drive linear servo motor which may comprise a shaft formed by magnets, the shaft being surrounded by cylindrically wound coils which form a "forcer", which is capable of linear displacement of the shaft.

According to one embodiment, the slide holder is movable over a distance of up to two times the lateral dimensions of the slide or the sample portion of the slide along two lateral dimensions corresponding to lateral main axes of the slide (collinear with the sides of rectangular slides). Thus, the slide holder is preferably movable up to 2×76 mm in the longitudinal direction of the slide and up to 2×52 mm or up to 2×26 mm in the lateral direction of the slide. Typically, the slide holder is movable about 30 to 150 mm, in particular 50 to 150 mm, in the longitudinal direction of the slide, and 20 to 150 mm, in particular 30 to 140 mm, in the lateral direction of the slide. According to one embodiment, the slide holder is movable 0.01 to 1 mm, in particular not more than 0.6 mm along the axis perpendicular to the plane of the slide.

In another embodiment, the manipulator is capable of providing controlled movement between the portions in two lateral dimensions, for example using the above mentioned driving means. These directions are the x and y directions. In the z direction movement of the slide holder can be replaced with lenses which allow for changing the focus.

According to one embodiment, the holder comprises a light channel through which imaging light can pass from the direction of the base portion to a slide placed on the slide holder. This allows for the holder to be used in microscopes with a lights source placed below the sample stage.

According to one embodiment, the light channel extends through the base portion and the slide holder portion and has a minimum lateral cross-sectional area which is at least 20% smaller than the lateral cross-sectional area of the mounting zone (and hence the slide placed on it). The range of movement and therefore the area to be imaged is typically relatively small. The light channel can, for example, have an area at least 50% smaller and even more than 90% smaller than the area of the mounting zone. The area is determined primarily by the optical properties of the microscope or by the size of the object or by a combination of them both.

There may also be arranged a light collector, such an convex lens, that concentrates light into a cone that illuminates the specimen with uniform intensity over the entire view field on at least portion of the slide mounted on the mounting zone.

According to a preferred embodiment, the slide holder comprises an input for electrical control signal for driving the manipulator to move the slide holder portion in the two lateral dimensions of the slide for scanning an area of the slide with the microscope. There may separate inputs for power and control signal or they may integrated into a single input.

The slide holder is preferably used in an optical microscope comprising a camera optically connected to the lens system. In addition, there may be provided control means functionally connected to the slide holder and the camera for moving the slide holder portion of the slide holder according to a scanning scheme and triggering the camera at a plurality of time points of the scanning scheme for taking a plurality of images corresponding to a plurality of locations of the slide. There is typically also provided a data processing unit having means for storing the plurality of images and means for combining them into a larger image.

Next, embodiments and advantages thereof are described in more detail with reference to the attached drawings.

FIG. 1 shows a conventional optical microscope comprising a support 10 and an arm 11 extending from the support. Attached to the arm 11 is a sample stage 12 and viewing optics. The viewing optics comprises a lens system or objective 14 and a viewing tube 13 optically connected to the objective. The viewing tube bay be replaced or supplemented with a digital imaging unit. The sample stage 12 comprises a zone for placement of a slide 16 containing the sample to be imaged. The optical focus plane of the objective 14 is adapted to be at or close to the slide. To provide a wider focal adjusting range for the microscope, there may also be means (not shown) for adjusting distance between the sample stage 12 and the objective 14 for focusing the objective accurately to the sample to be imaged. Alternatively or in addition to that, the objective 14 may comprise a suitable adjustable lens system (not shown) for allowing internal focusing of the objective 14. The sample is illuminated using a light source 15 from below. The sample stage 12 typically comprises an aperture allowing the light to pass though it to the slide and further to the sample. The slide can be immobilized with respect to the sample stage using suitable immobilization means, such as slide clips or a suitably dimensioned recess on the upper surface of the stage 12.

Figure 2:
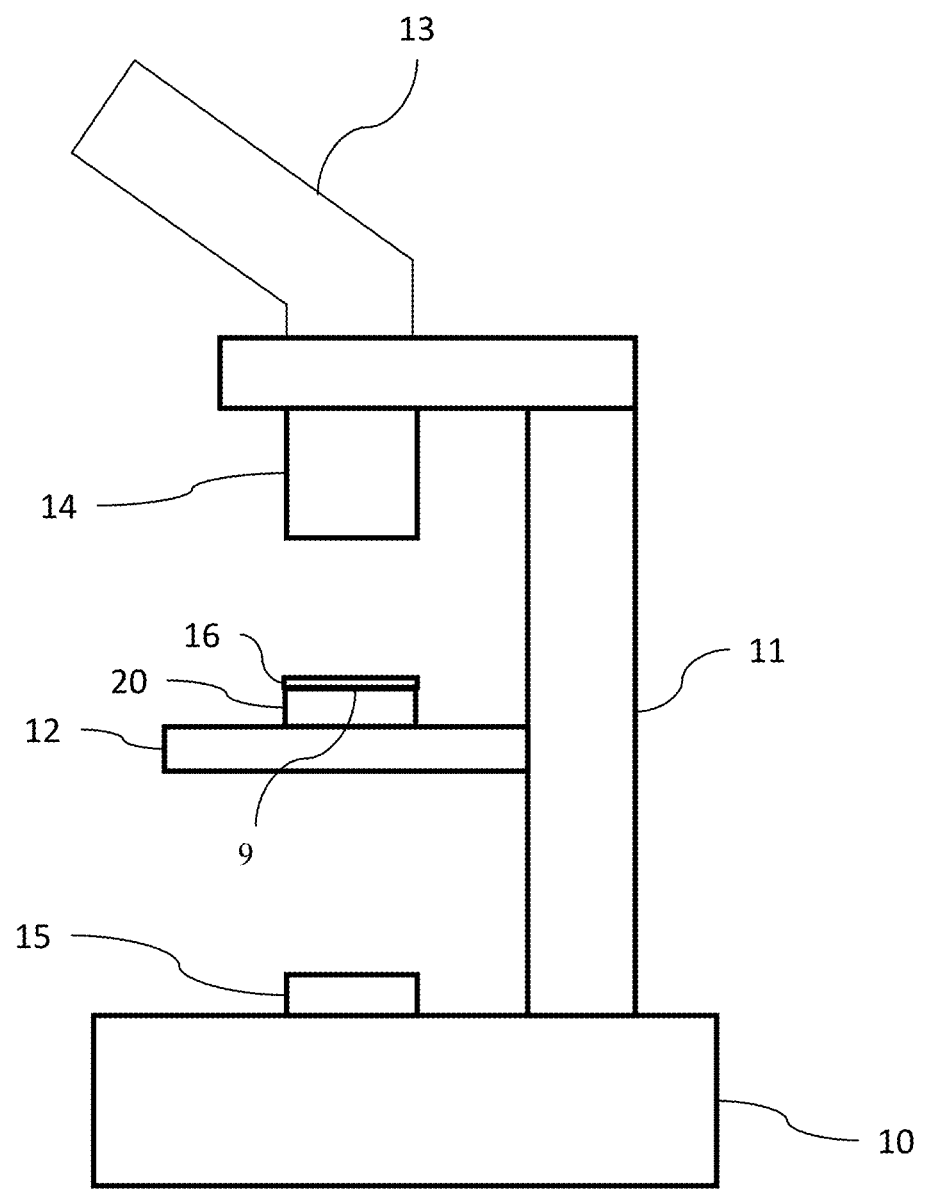
FIG. 2 shows a schematic side view of a microscope provided with a microscope slide holder according to the invention.

FIG. 2 illustrates an optical microscope similar to that of FIG. 1 provided with a slide holder 20 according to the invention. The slide holder 20 is placed on the position at the zone of the sample stage 12 normally adapted to accommodate the slide. Instead of that, the slide 16 is placed on the slide holder still within the focal adjusting range of the microscope. The slide holder 20 is designed to allow light to pass from below to the slide 16 or it may comprise an internal light source.

Figure 3A:
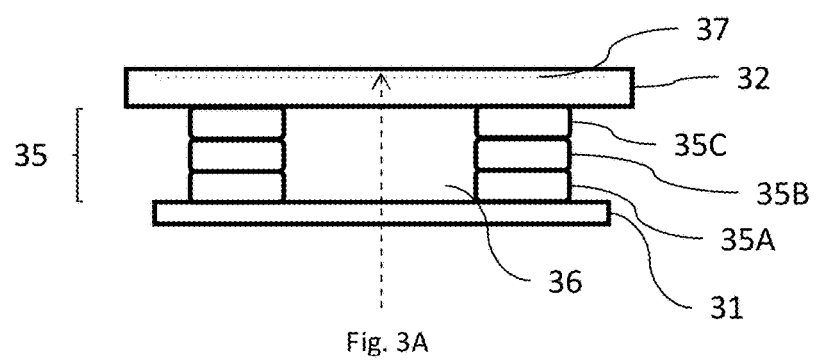
FIG. 3A shows a schematic cross-sectional view of a slide holder according to one embodiment of the invention.
Figure 3B:
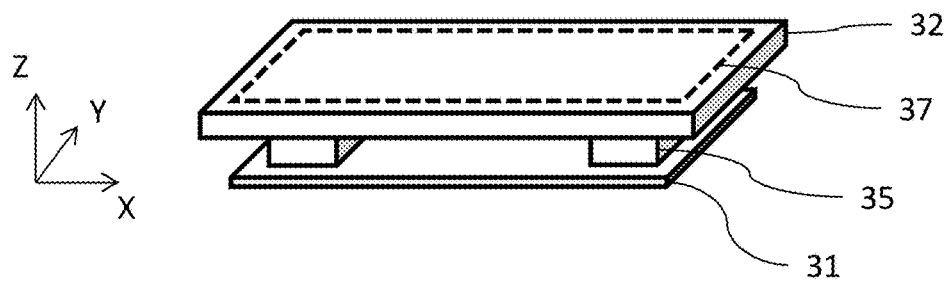
FIG. 3B illustrates a 3D view of a slide holder according to one embodiment of the invention.

The slide holder is exemplified in more detail in FIGS. 3A and 3B. In the schematic illustrations, there is provided a base portion 31 which can be placed against the sample stage of the microscope and immobilized thereon. On top of the base portion 31, there is a slide holder portion 32 provided with means 37 of immobilizing a slide. Like on the conventional sample stages, the immobilization means 37 may comprise slide clips or a recess dimensioned for the slide, or any other suitable means. Alternatives for the immobilization means include e.g. a plurality of protrusions on the surface of the slide holder portion 37 and magnetic grabbers.

The slide holder is further provided with a manipulator 35 capable of moving the slide holder portion 32 with respect to the base portion 31. The present schematic shows three manipulator layers 35A, 35B, 35C, each adapted to move the slide holder portion 32 in different orthogonal directions, i.e, lateral dimensions X and Y and height dimension Z. The manipulator 35 preferably comprises a plurality of piezoelectric elements capable of moving the slide holder portion in all three dimensions. For example in the simplified image of FIG. 3A, the lowermost of the manipulator layers 35A can move the topping layers in X-dimension, the middle layer 35B in Y-dimension (X and Y being the lateral dimensions) and the top layer 35C in Z-dimension (height dimension), or in any other combination.

The slide holder of the embodiment is dimensioned for slides having the standard size of 76 mm by 26 mm. The range of movement of the slide holder portion 32 longitudinally is typically 15 to 80 mm, and laterally 10 to 30 mm. In the height dimension Z, a shorter range, e.g. 0.01-0.6 mm, typically suffices as it is typically used for focal fine-tuning. Piezoactive materials known per se provide such mobility and very accurate positioning, the accuracy being typically of the order 0.1-10 μm, in particular 0.5-1 μm.

Piezoelectric elements perform a very high number of single movement events without losing accuracy or requiring maintenance. A single piezoelectric element easily withstands at least 100 . . . 100 000 movements typically required for imaging purposes.

However linear shaft motors can also be used, as mentioned above. They also provide mobility in combination with accurate positioning.

The manipulator 35, the base portion 31, and the slide holder portion 32 are preferably arranged such that they allow light to pass from the direction of the base portion 31 to the slide placed on the slide holder portion 32. Thus, the elements are entirely transparent or there is a transparent zone and/or void in each of the elements aligned such that a channel 36 for light is formed through the slide holder. The dashed arrow directed upwards in FIG. 3A depicts light coming from below and passing the light channel up to the sample level. According to one embodiment, the holder is provided with one or more optical elements which concentrate light into a cone that illuminates the specimen with uniform intensity over the entire viewfield.

This can be achieved using a focusing lens or a suitable mirror arrangement, for example. Such an arrangement compensates for the fact that the microscope slide becomes positioned farther from the light source than if it would be placed directly on the sample stage.

The largest dimension in any of the orthogonal dimensions X, Y or Z of the slide holder is preferably less than 200 mm, in particular less than 160 mm the height (Z) being preferably less than 40 mm. The largest dimension of the base portion (lowest portion of the slide holder) is preferably less than 80 mm (+/−1 mm) and optionally has one or more subportions with a thickness less than 5 mm and being open at the upper side, to ensure compatibility with existing slide immobilization mechanisms. This ensures the compatibility of the slide holder with most of the existing microscopes, at least those used in high-resolution cell imaging.

Figure 4:
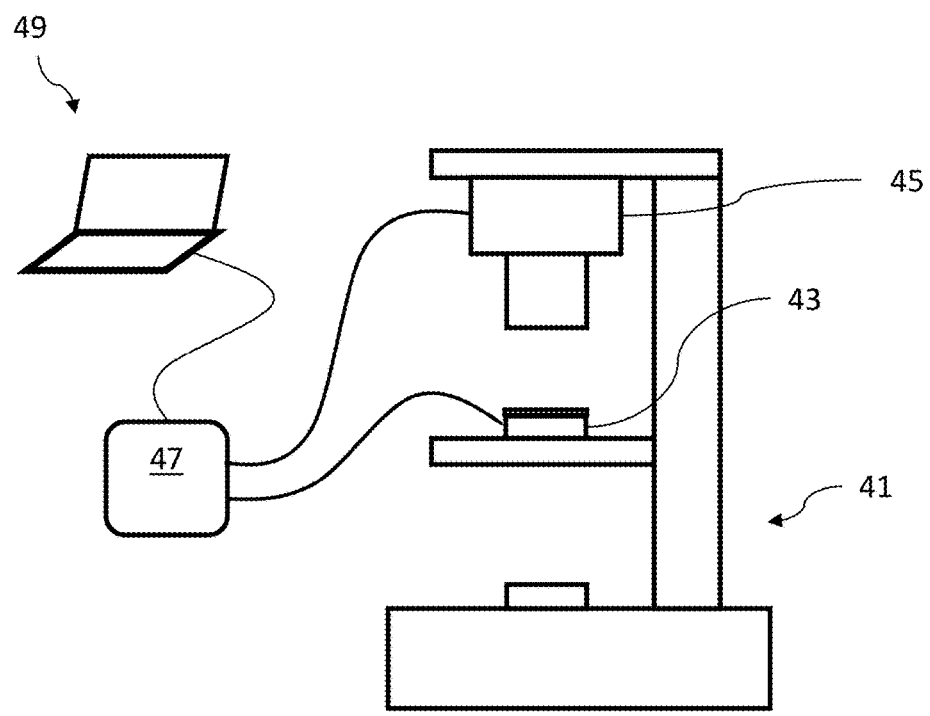
FIG. 4 illustrates a microscope with a slide holder and imaging device control unit.

FIG. 4 illustrates an automated microscope system with a microscope 41 having a camera 45 and a slide holder 43 according to the invention. The camera 45 and the slide holder 43 are connected to a control unit 47 which is adapted to perform a scanning microscopic imaging process by synchronizing the movement of the slide holder 43 and image capturing of the camera 45, such that a predefined imaging area will be covered. The control unit is further connected to a computer 49 for storing and/or processing and/or combining and/or displaying the captured images.

The control unit 47 is for clarity reasons herein shown as a separate unit but it may also integrated into the computer 49 or to the microscope 41. Further, the microscope 41 may comprise integral processing unit performing one or more of the tasks of the computer 49 listed above.

Figure 5:
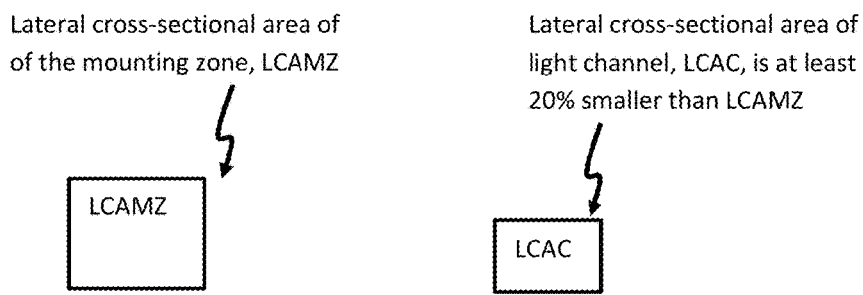
FIG. 5 illustrates a lateral cross-sectional area of a slide holder and lateral cross-sectional area of a mounting zone.

FIG. 5 illustrates a lateral cross-sectional area of a slide holder and lateral cross-sectional area of a mounting zone. The slide holder is a microscope slide holder for an optical microscope and has a base portion, a slide holder portion arranged on the base portion and having a mounting zone capable of receiving microscope slides. The slide holder portion is movably arranged on the base portion. The slide holder has a manipulator for moving the slide holder portion with respect to the base portion in at least two orthogonal directions. The base portion is dimensioned to fit into another mounting zone that is of a slide holder of the optical microscope designed for holding a single slide at a time in the optical microscope. The slide holder has a light channel through which imaging light can pass from a direction of the base portion to a slide placed on the slide holder portion. The light channel extends through the base portion and the slide holder portion and has a minimum lateral cross-sectional area, LCAC, which is at least 20% smaller than a lateral cross-sectional area of the mounting zone, LCAMZ, of the slide holder portion.

Solution to Problem

One of the aims of the invention is, in one embodiment, achieved by providing a microscope slide holder, comprising a base portion, a slide holder portion arranged on the base portion and having a mounting zone capable of receiving at least one type of microscope slides, the slide holder portion being movably arranged on the base portion. There is also provided a manipulator for moving the slide holder portion with respect to the base portion in at least two lateral directions, preferably all three orthogonal directions.

According to the invention, the base portion is dimensioned to fit into a mounting zone designed for at least one of the one or more microscope slide types, which the slide holder portion is designed for. Thus, there is a certain degree of "compatibility" on the upper and lower surfaces of the holder. For example, if the holder is designed to mount standard 26×76 mm slides, it also fits onto a sample stage of a microscope designed for similar slides.

Another aim is achieved by providing a novel scanning microscope arrangement. The microscope comprises a sample stage having a slide mounting zone for holding a microscope slide of at least one type, means for illuminating the slide placed on the sample stage, and a microscopic lens system for microscopically imaging a sample placed on the slide. According to the invention, there is provided a microscope slide holder of the kind described above at the slide mounting zone of the sample stage. A slide to be imaged with the microscope is placed, instead of the mounting zone of the sample stage, to the mounting zone of the slide holder. The sample stage is preferably at least laterally stationary, i.e. incapable of itself moving the sample in the X-Y plane.

More specifically, the invention is defined in the independent claims.

Advantageous Effects of Invention

The invention achieves considerable advantages. Most importantly, it allows for microscopes designed for conventional, static imaging of slides to be converted to scanning microscopes simply by placing the present slide holder to the place of the slide on the sample stage. The sample stage needs no modification and can outside the slide mounting zone be of any type, size and shape, since the holder is designed to take the position of the slide only. For example, potential slide holder clips can remain in place and used to immobilize the slide holder. The microscope is also rapidly convertible back for conventional imaging only by removing the slide holder.

The manipulator of the holder allows for the slide to be placed on the holder to be moved electronically laterally to scan the sample on the slide, and potentially also vertically to fine-tune focus of the microscope. The holder does not prevent the use of a built-in light source of the microscope typically placed below the sample stage, since it can be shaped suitably or equipped with optical means so as to allow light to pass the slide.

INDUSTRIAL APPLICABILITY

Preferred uses of the invention include microscopy of biological samples, such as tissue samples, cytological samples, blood samples, urine samples, stool samples, sputum samples and various other liquids. The invention is also useful in plant microscopy as well as in material diagnostics, such as in microscopy of geological samples as well as semiconductor specimens.

A particular area of application is digital high-resolution imaging of samples that cover almost the entire microscope slide e.g. blood and bone marrow smears or tissue samples. Such imaging requires a plurality of movements of the sample and digital image capturing events at different physical locations of the sample with respect to the optical axis of the microscope optics.

Similar applications exist in other fields of academic and industrial research and quality control, for example.

REFERENCE SIGNS LIST 9 mounting zone
10 support
11 arm extending from the support
12 sample stage
13 viewing tube
14 a lens system or objective
15 light source
16 slide
20 slide holder
31 base portion
32 slide holder portion
35 manipulator
35A to C manipulator layers
36 light channel
37 means for immobilizing a slide
41 microscope
43 slide holder
45 camera
47 control unit
79 computer

CITATION LIST

Patent Literature

WO 2005/101088
WO 2011/138603
WO 2013/138911
US 2010/073672
US 2008/266440
US 2011/089771
US 2012/147461
US 2002/101654.

The invention claimed is:

1. A microscope slide holder for an optical microscope, comprising:
   a base portion,
   a slide holder portion arranged on the base portion and having a mounting zone capable of receiving microscope slides, the slide holder portion being movably arranged on the base portion,
   a manipulator for moving the slide holder portion with respect to the base portion in at least two orthogonal directions,
   wherein:
   the base portion is dimensioned to fit into another mounting zone that is of a slide holder of the optical microscope designed for holding a single slide at a time in the optical microscope.

2. The slide holder according to claim 1, wherein the base portion is dimensioned to fit into said another mounting zone designed for rectangular 76 mm by N×26 mm slides, where N is an integer equal to 1 or 2.

3. The slide holder according to claim 1, wherein the manipulator comprises one or more piezoactive elements or linear shaft motors capable of moving the slide holder portion in said at least two orthogonal directions upon electric excitation.

4. The slide holder according to claim 1, wherein the slide holder portion is movable along axes in longitudal and lateral dimensions of the slide received to the mounting zone of the slide holder portion such that a distance moved along each axis is up to two times a dimension of the slide or a sample portion along the axis.

5. The slide holder according to claim 1, wherein the slide holder portion is movable at least 0.01 to 1 mm along an axis perpendicular to a plane of the slide received to the mounting zone of the slide holder portion.

6. The slide holder according to claim 1, comprising a light channel through which imaging light can pass from a direction of the base portion to a slide placed on the slide holder portion.

7. The slide holder according to claim 6, wherein the light channel extends through the base portion and the slide holder portion and has a minimum lateral cross-sectional area which is at least 20% smaller than a lateral cross-sectional area of the mounting zone of the slide holder portion.

8. The slide holder according to claim 1, further comprising an input for electrical control signal for driving the manipulator to move the slide holder portion along axes in longitudal and lateral dimensions of the slide received to the mounting zone of the slide holder portion for scanning an area of the slide with the microscope.

9. The slide holder according to claim 1, wherein the thickness of the base portion is less than 5 mm on one or two subportions thereof, the subportions being open so as to allow means of immobilizing a slide of a microscope to immobilize the slide holder on a sample stage of the microscope.

10. The slide holder according to claim 1, wherein the manipulator is capable of moving the slide holder portion with respect to the base portion in three orthogonal directions.

11. The slide holder according to claim 1, wherein the slide mounting zone of the slide holder portion is capable of through-illumination of a slide positioned on the mounting zone of the slide holder portion by light from a light source of the optical microscope.

12. An optical microscope comprising:
   a sample stage having a microscope slide mounting zone designed for holding a single microscope slide at a time,
   a light source for illuminating the slide placed on the sample stage,
   a microscopic lens system for microscopically imaging the slide, and
   a slide holder comprising:
      a base portion placed at the slide mounting zone of the sample stage, said base portion being dimensioned to fit onto the mounting zone,
      a slide holder portion arranged on the base portion and having a mounting zone capable of receiving microscope slides, the slide holder portion being movably arranged on the base portion,
      a manipulator for moving the slide holder portion with respect to the base portion in at least two orthogonal directions.

13. The optical microscope according to claim 12, further comprising a camera optically connected to the lens system.

14. The optical microscope according to claim 13, further comprising control means functionally connected to the slide holder and the camera for moving the slide holder portion of the slide holder according to a predefined scanning scheme and triggering the camera at a plurality of time points of the scanning scheme for taking a plurality of images corresponding to a plurality of locations of the slide.

15. The optical microscope according to claim 12, further comprising a data processing unit having means for storing a plurality of images and means for combining them into a larger image.

16. The optical microscope according to claim 12, wherein the slide mounting zone of the slide holder portion is capable of through-illumination of a slide positioned on the mounting zone of the slide holder portion by light from the light source.

* * * * *